United States Patent
Najt et al.

(10) Patent No.: US 7,802,553 B2
(45) Date of Patent: Sep. 28, 2010

(54) METHOD TO IMPROVE COMBUSTION STABILITY IN A CONTROLLED AUTO-IGNITION COMBUSTION ENGINE

(75) Inventors: Paul M. Najt, Bloomfield Hills, MI (US); Tang-Wei Kuo, Troy, MI (US); James A. Eng, Troy, MI (US); Rodney B. Rask, Grosse Pointe Woods, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 106 days.

(21) Appl. No.: 11/399,640

(22) Filed: Apr. 6, 2006

(65) Prior Publication Data

US 2007/0084449 A1    Apr. 19, 2007

Related U.S. Application Data

(60) Provisional application No. 60/727,702, filed on Oct. 18, 2005.

(51) Int. Cl.
*F02B 51/02*    (2006.01)
(52) U.S. Cl. .................................................. 123/193.6
(58) Field of Classification Search ................ 123/668, 123/188.3, 276, 305, 669, 657, 193.1–193.6
See application file for complete search history.

(56) References Cited

U.S. PATENT DOCUMENTS

| | | | | |
|---|---|---|---|---|
| 3,082,752 | A | * | 3/1963 | Thomas ...................... 123/668 |
| 4,074,671 | A | * | 2/1978 | Pennila ....................... 123/668 |
| 4,351,292 | A | * | 9/1982 | Worthen et al. .......... 123/188.3 |
| 4,495,907 | A | * | 1/1985 | Kamo ...................... 123/193.2 |
| 4,646,707 | A | * | 3/1987 | Pfefferle ..................... 123/668 |
| 4,738,227 | A | * | 4/1988 | Kamo et al. .................. 123/23 |
| 4,819,595 | A | * | 4/1989 | Pfefferle ..................... 123/272 |
| 4,852,542 | A | * | 8/1989 | Kamo et al. ................. 123/668 |
| 5,097,807 | A | | 3/1992 | Oikawa et al. |
| 5,305,726 | A | * | 4/1994 | Scharman et al. ........... 123/668 |

(Continued)

FOREIGN PATENT DOCUMENTS

JP          61218715 A  *  9/1986

OTHER PUBLICATIONS

Kamo, R., Thin Thermal Barrier Coatings for Engines, SAE Technical Paper Series, Feb. 27, 1989, pp. 23-28, No. 890143, SAE, Warrendale, PA, USA.

(Continued)

*Primary Examiner*—M. McMahon

(57) ABSTRACT

A method to control combustion in an HCCI engine, to mitigate effects of combustion chamber deposits is detailed. The method comprises applying a specific surface coating to a combustion chamber surface. The surface coating has thermal properties substantially similar to the combustion chamber deposits. The thermal properties preferably include a) thermal conductivity, b) heat capacity, and c) thermal diffusivity. Applying a surface coating results in a reduction of combustion variability due to variation in combustion chamber deposits, and an improvement on combustion stability at low loads due to reduced heat loss. A preferred thermally insulating surface coating includes thermal parameters of a heat capacity in a range of $0.03 \times 10^6$ $J/m^3$-K to $2.0 \times 10^6$ $J/m^3$-K; a thermal conductivity in a range of 0.25 W/m-K to 2.5 W/m-K; and, a thermal diffusivity in a range of $1 \times 10^{-7}$ $m^2/s$ to $8 \times 10^{-6}$ $m^2/s$.

11 Claims, 5 Drawing Sheets

U.S. PATENT DOCUMENTS

| | | | |
|---|---|---|---|
| 5,384,200 A * | 1/1995 | Giles et al. ................. 428/552 |
| 5,477,820 A * | 12/1995 | Rao ........................ 123/193.6 |
| 5,522,371 A * | 6/1996 | Kawamura ................. 123/668 |
| 5,687,679 A * | 11/1997 | Mullin et al. ............ 123/41.79 |
| 5,766,693 A | 6/1998 | Rao |
| 5,987,882 A * | 11/1999 | Voss et al. .................... 60/274 |
| 6,044,830 A * | 4/2000 | Jones ........................ 123/670 |
| 6,159,554 A | 12/2000 | Kloft et al. |
| 6,170,441 B1 * | 1/2001 | Haldeman et al. ......... 123/25 D |
| 6,280,796 B1 | 8/2001 | Kloft et al. |
| 6,390,054 B1 | 5/2002 | Yang |
| 6,422,008 B2 * | 7/2002 | Voss et al. .................... 60/299 |
| 6,640,754 B1 | 11/2003 | Iida |
| 6,656,600 B2 * | 12/2003 | Strangman et al. .......... 428/472 |
| 6,662,785 B1 | 12/2003 | Sloane et al. |
| 6,701,882 B2 | 3/2004 | Barbezat |
| 6,877,473 B2 | 4/2005 | Bischofberger et al. |
| 6,923,167 B2 | 8/2005 | Flowers |
| 7,055,491 B2 * | 6/2006 | Linderyd et al. ............ 123/279 |
| 2003/0136367 A1 | 7/2003 | Southerland |
| 2003/0150419 A1 | 8/2003 | Daragheh et al. |
| 2004/0089260 A1 | 5/2004 | Nozaki et al. |
| 2004/0226547 A1 | 11/2004 | Holzleitner et al. |
| 2005/0065706 A1 | 3/2005 | Gray, Jr. |
| 2005/0284441 A1 | 12/2005 | Liu et al. |
| 2005/0288846 A1 | 12/2005 | Liu et al. |

OTHER PUBLICATIONS

Assanis, D, Evaluation of Alternative Thermocouple Designs for Transient Heat Transfer Measurements in Metal and Ceramic Engines, SAE Technical Paper Series, Feb. 27, 1989, pp. 168-184, No. 890571, SAE, Warrendale, PA, USA.

Cheng, S.S., Effect of Engine Operating Parameters on Engine Combustion Chamber Deposits, SAE Technical Paper Series, Oct. 22, 1990, No. 902108, SAE, Warrendale, PA USA.

Nakic, D.J., Effect of Elevated Piston Temperature on Combustion Chamber Deposit Growth, SAE Technical Paper Series, 1994, pp. 1-13, No. 940948, SAE, Warrendale, PA, USA.

Hopwood, A.B., A Technique to Measure Thermal Diffusivity and Thickness of Combustion Chamber Deposits In-Situ, SAE Technical Paper Series, Oct. 19, 1998, pp. 1-10, No. 982590 SAE, Warrendale, PA, USA.

Nishiwaki, K., The Determination of Thermal Properties of Engine Combustion Chamber Deposits, SAE Technical Paper Series, Mar. 6, 2000, pp. 1-14, No. 2000-01-1215, SAE, Warrendale, PA, USA.

* cited by examiner

METHOD TO IMPROVE COMBUSTION STABILITY IN A CONTROLLED AUTO-IGNITION COMBUSTION ENGINE

CROSS-REFERENCE TO RELATED APPLICATIONS

This application claims priority from U.S. Provisional Application No. 60/727,702, filed Oct. 18, 2005, entitled SURFACE COATING TO MITIGATE EFFECT OF COMBUSTION CHAMBER DEPOSIT ON CONTROLLED AUTO-IGNITION COMBUSTION.

TECHNICAL FIELD

This invention pertains generally to internal combustion engine control systems, and more specifically to a method and system to improve combustion stability in a controlled auto-ignition engine.

BACKGROUND OF THE INVENTION

To improve thermal efficiency of gasoline internal combustion engines, including four-stroke engines, a dilute combustion charge—using either air or re-circulated exhaust gas—is known to give enhanced thermal efficiency and low NOx emissions. However, there is a limit at which an engine can be operated with a diluted combustion charge because of misfire and combustion instability as a result of a slow burn. Known methods to extend the dilution limit include 1) improving ignitability of the combustion by enhancing ignition and fuel preparation, 2) increasing the flame speed by introducing charge motion and turbulence, and 3) operating the engine under controlled auto-ignition combustion.

The controlled auto-ignition combustion process is also referred to as Homogeneous Charge Compression Ignition ("HCCI") process. In this process, an intake charge, comprising a mixture of air, fuel, and previously combusted gases is created in an engine combustion chamber. Auto-ignition of the intake charge is initiated simultaneously from many ignition sites during compression stroke in the combustion chamber, resulting in stable engine power output and high thermal efficiency. Since the combustion is highly diluted and uniformly distributed throughout the intake charge, the burnt gas temperature and hence NOx emissions are substantially lower than those of a traditional spark ignition engine based on propagating flame front and a diesel engine based on an attached diffusion flame.

HCCI combustion and combustion stability are sensitive to variations in in-cylinder temperatures, and thus to heat loss through cylinder walls. It is well known in the literature that decreasing cylinder heat losses results in more stable, robust combustion during controlled auto-ignition operation. Combustion chamber surface temperature for an engine operated under controlled auto-ignition combustion is important for two reasons. First, a thermal boundary layer located adjacent to the cylinder walls contains a significant percentage of the trapped fuel within the cylinder, as much as 30% under specific operating conditions. The thermal boundary layer adjacent the cylinder walls is typically at the lowest temperature within the cylinder, and therefore any combustible gases located thereat are the last portion of the combustion charge to burn during each ignition cycle. It is well known that low load limit of an HCCI engine is derived based upon an ability of the HCCI engine to effectively and efficiently ignite the last portion of the intake charge at the cylinder walls. Therefore, an increase in wall temperature of a combustion chamber increases the combustion rate, increasing ability for the last portion of the charge located near the cylinder walls to burn, increasing the low load stable engine operation.

It is known that combustion chamber deposits ("CCD") form a thermal insulation layer within each combustion chamber and cylinder. Solid deposits on walls of a combustion chamber are formed when wall surface temperature is lower than roughly 600 K (300 deg C.). Combustion chamber deposits have been shown to extend the speed/load operating range of engines operating under HCCI combustion. However, CCD properties and thicknesses are subject to change during engine operation. Therefore, it is preferable for stable HCCI combustion control if the deposits are not formed, or are maintained at a minimal level.

It has been found experimentally, as described herein, that physical and thermal characteristics of the controlled auto-ignition combustion engine are affected by combustion chamber deposits, thus increasing combustion variability.

Therefore, there is a need to improve combustion stability in a HCCI engine operated under a controlled auto-ignition mode due to effects caused by varying levels of combustion chamber deposits.

SUMMARY OF THE INVENTION

The invention described herein addresses the above-mentioned concerns, by setting forth a method to control combustion in an internal combustion engine adapted to be operative in a controlled auto-ignition mode, comprising applying a surface coating to a component of a combustion chamber of the HCCI internal combustion engine. The surface coating has thermal properties substantially similar to deposits of combustion occurring within the combustion chamber. The thermal properties preferably include at least one of a) thermal conductivity, b) heat capacity, and c) thermal diffusivity. The application of the surface coating having characteristics of combustion chamber deposits can provide benefits which include: 1) reduction of combustion variability due to variation in magnitude of combustion chamber deposits and 2) improvement on combustion stability of an engine operated under controlled auto-ignition processes at low loads due to reduced heat loss.

Test data included herein demonstrates that operating characteristics of an internal combustion engine capable of operating with a controlled auto-ignition process change between an engine having clean combustion chambers, and an engine having combustion chambers which are covered with CCD (combustion chamber deposits). Furthermore, it was observed experimentally that combustion is affected by the status of CCD during engine tests, and further affected by engine operating conditions. Therefore an aspect of the invention comprises a method and apparatus for controlling combustion in a direct-injection, four-stroke, internal combustion engine including a variable volume combustion chamber defined by a piston reciprocating within a cylinder between top-dead-center and bottom-dead-center points and a cylinder head comprising an intake valve and an exhaust valve. The internal combustion engine adapted to be operative in a controlled auto-ignition combustion mode. A portion of surfaces of each combustion chamber has a thermally insulating surface coating applied. The preferred thermally insulating surface coating comprising the following thermal parameters: a) heat capacity in a range of $0.03 \times 10^6$ J/m$^3$-K to $2.0 \times 10^6$ J/M$^3$-K; b) thermal conductivity in a range of 0.25 W/m-K to 2.5 W/m-K; and, c) thermal diffusivity in a range of $1 \times 10^{-7}$ m$^2$/s to $8 \times 10^{-6}$ m$^2$/s. The portion of each combustion chamber having an applied thermally insulating surface coating includes a surface portion of the piston, the surface of the walls of the cylinder, surfaces of the intake and exhaust valves, a surface portion of the cylinder head exposed to the combustion chamber, and various combinations thereof.

Another aspect of the invention includes a method to control combustion in an internal combustion engine adapted to be operative in a controlled auto-ignition combustion mode, comprising: applying the aforementioned thermally-insulating surface coating to a portion of surfaces of the combustion chamber.

Another aspect of the invention includes a method to mitigate effect of combustion chamber deposits on combustion in an internal combustion engine adapted to be operative in a controlled auto-ignition combustion mode, comprising applying the aforementioned thermally-insulating surface coating to a portion of surfaces of the combustion chamber.

Another aspect of the invention comprises a method for extending a speed/load range of operation in a controlled auto-ignition combustion mode of an internal combustion engine adapted to be operative in the controlled auto-ignition combustion mode by applying a thermally-insulating surface coating to a portion of surfaces of the combustion chamber, wherein extending range of operation in a controlled auto-ignition combustion mode comprises extending engine load operating range in a low engine load region.

Another aspect of the invention comprises a surface coating applicable to a component of a combustion chamber of an internal combustion engine capable of operating with a controlled auto-ignition process, said surface coating having physical and thermal properties substantially similar to deposits of combustion occurring within the combustion chamber.

Benefits of the present invention include: 1) reduction of combustion variability due to change in quantity of CCD over operating life of the engine, and during individual operating periods of the engine, and 2) improvement on HCCI combustion stability at low load limit due to reduced heat loss. An additional benefit of using such a surface coating for HCCI engine operation includes extending low load operation limit due to reduction of heat loss through the combustion chamber wall.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the drawings incorporated hereinafter, comprising.

DETAILED DESCRIPTION OF THE PREFERRED EMBODIMENT

Figure 1:
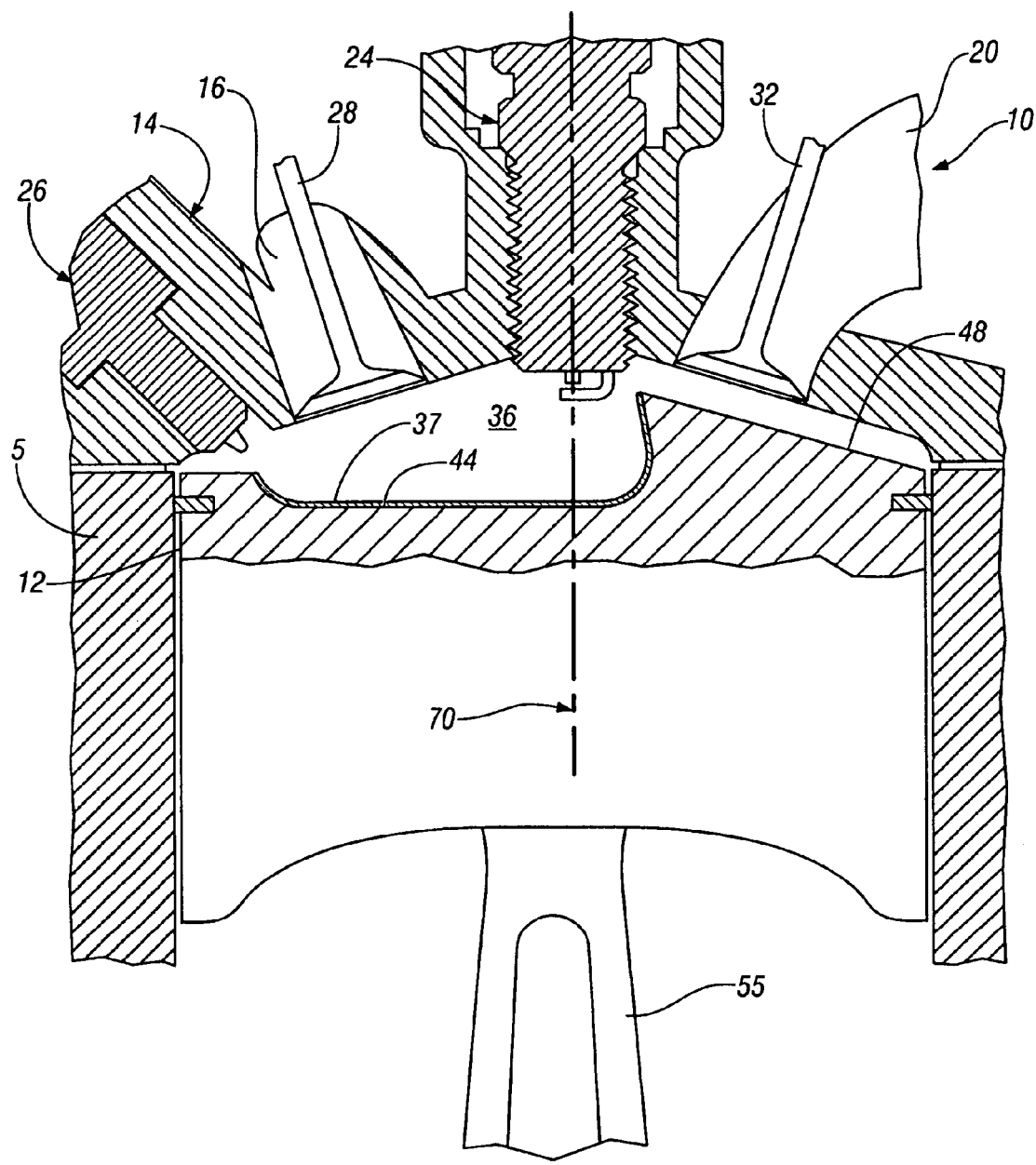
FIG. 1 is a schematic illustration of elements of a spark-ignition, direct-injection four stroke internal combustion engine, in accordance with the present invention; and, FIGS. 2-7 are datagraphs, in accordance with the present invention.

Referring now to the drawings, wherein the showings are for the purpose of illustrating the invention only and not for the purpose of limiting the same, FIG. 1 shows aspects of an internal combustion engine 10 constructed in accordance with an embodiment of the present invention.

It should be appreciated that the present invention is applicable to a spark-ignition, direct-injection, four-stroke internal combustion engine adapted to operate with a controlled auto-ignition process, also referred to as a homogenous-charge, compression-ignition ('HCCI') engine.

The exemplary engine 10 comprises: a cast-metal engine block with at least one cylinder 5 formed therein, and an engine head 14. Each cylinder comprises a closed-end cylinder 5 having a moveable, reciprocating piston 12 inserted therein. A variable volume combustion chamber 36 is formed in each cylinder, and is defined by walls of the cylinder, the moveable piston 12, and the head 14.

Each moveable piston 12 comprises a device having a design adapted for use in an HCCI engine, and manufactured in accordance with known piston forming methods, and includes a top portion, and a body portion which conforms substantially to the cylinder in which it operates. The top portion of the piston 12 includes a crown area 48 and a bowl area 44, each having a surface area exposed in the combustion chamber 36. Each piston is connected via a pin and connecting rod 55 to a crankshaft. The crankshaft is rotatably attached to the engine block at a main bearing area near a bottom portion of the engine block, such that the crankshaft is able to rotate around a longitudinal axis that is perpendicular to an axis defined by each cylinder 5. During operation of the engine, each piston moves up and down in the cylinder in a reciprocating fashion due to connection to the crankshaft and ongoing combustion in the combustion chamber 36. The rotation action of the crankshaft effects translation of linear force exerted on each piston during combustion to an angular torque output from the crankshaft, which can be transmitted to another device, e.g. a vehicle driveline.

The engine head 14 preferably comprises a cast-metal device having one or more intake ports 16 which supply air to the combustion chamber and one or more exhaust ports 20 which effect flow of exhaust gases from the combustion chamber 36. Flow of air through each intake port is controlled by actuation of an intake valve 28. Flow of exhaust gases through each exhaust port is controlled by actuation of an exhaust valve 32. The intake and exhaust valves each have a top portion that includes a surface that is exposed to the combustion chamber 36. Each valve of valves 28 and 32 has a stem that is connected to a valve actuation device, e.g. a camshaft.

A fuel injector 26 is installed in the head, adapted to inject fuel directly into each combustion chamber 36, and controlled by a control system. Specific details of a direct injection fuel injector are known and not detailed herein. There is a spark plug 24 operable to ignite an air/fuel intake charge mixture in the combustion chamber 36 under conditions determined by the control system. Valve actuation devices comprise any one of a number of known devices operable to control timing, duration, and magnitude of opening and closing of the valves, and are not described in detail herein. Specific details of the control system and a control scheme to control opening and closing of the valves are not detailed. The control system preferably comprises a subset of an overall control architecture operable to provide coordinated system control when the engine 10 described herein is employed in a vehicle. In overall operation, the control system is preferably operable to synthesize pertinent information and inputs, and execute algorithms to control various actuators to achieve control targets, including such parameters as fuel economy, emissions, performance, and, driveability. A thermal barrier coating 37 is shown that is applied to at least some of the surfaces of the combustion chamber, in this instance the bowl area 44 of the piston 12. The preferred thermal barrier coating comprises a thermally insulating surface coating 37 which mitigates the effect of combustion chamber deposits (CCD)

on operation of the engine described hereinabove, when operated under conditions of controlled auto-ignition combustion, and is described hereinbelow. Alternate embodiment of the system can have the thermal barrier coating 37 applied to various surfaces of the combustion chamber, in order to provide the effect of a thermal barrier.

Figure 2:
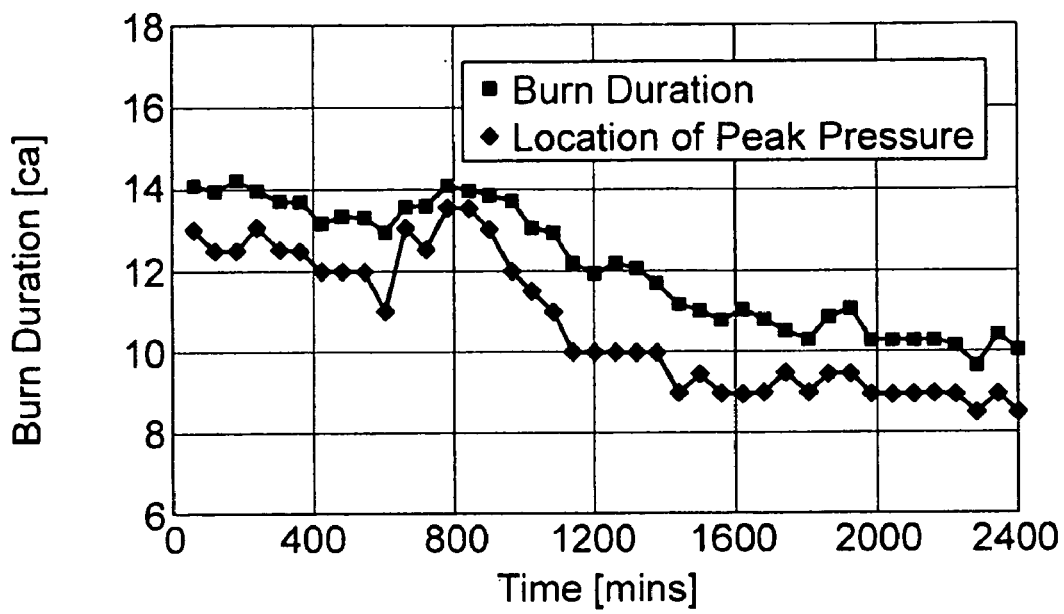
Figure 3:
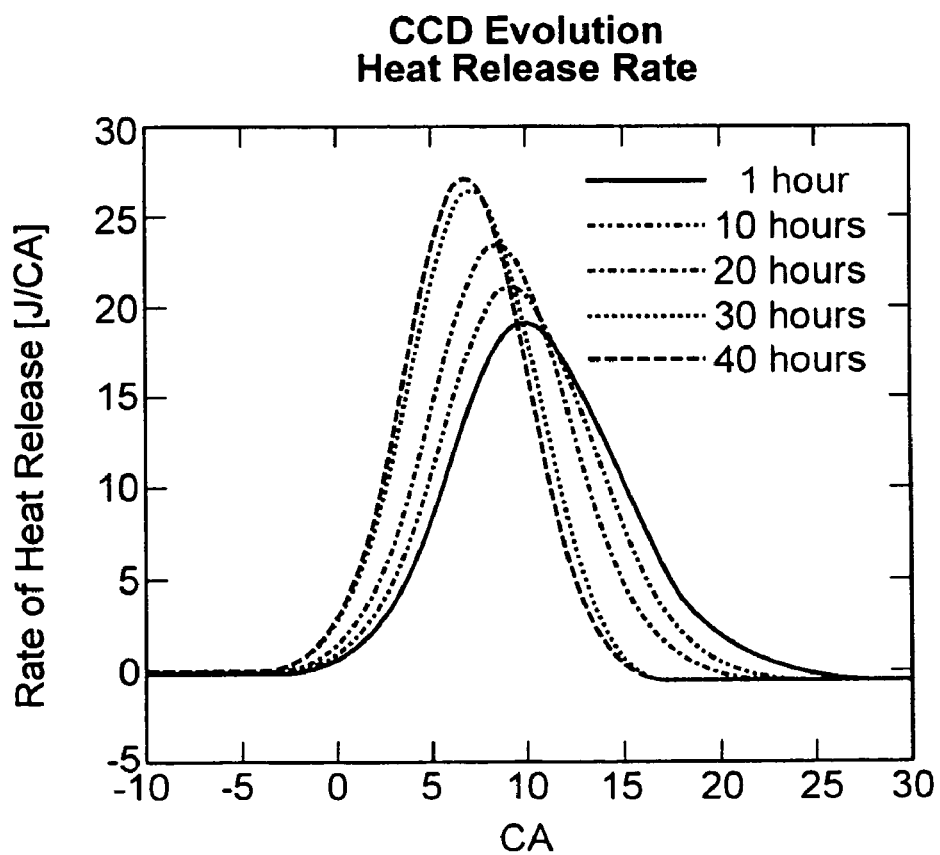
Figure 4:
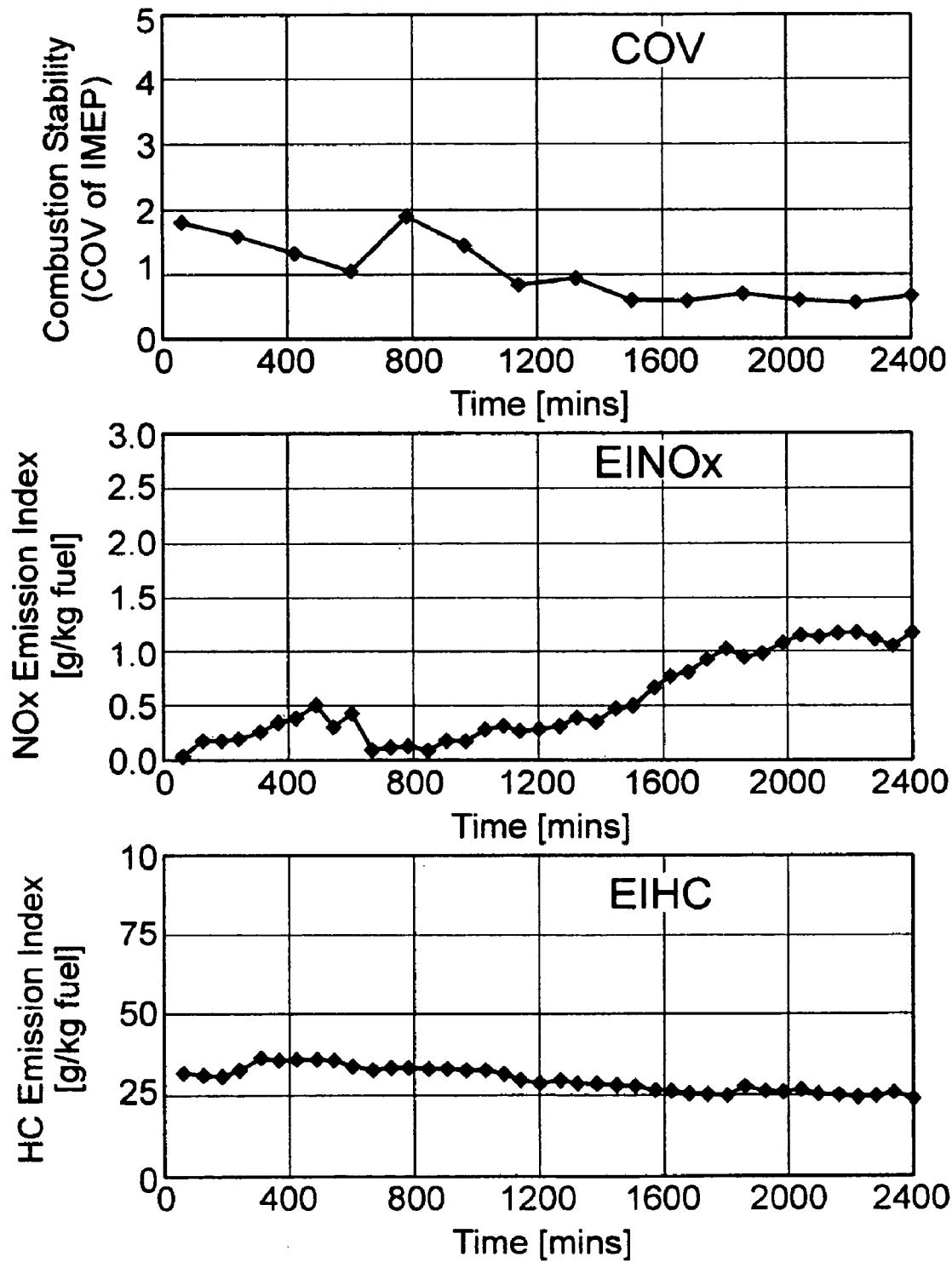

Referring now to FIGS. 2-4, details of the present invention relating to addition of thermal barrier coating 37 to the bowl area of each piston is described. In order to determine effects of combustion chamber deposits on engine operation, an exemplary engine adapted to operate under conditions of controlled auto-ignition mode was constructed and operated. An experimental procedure was formulated to identify and determine effects of formation of combustion chamber deposits (CCD). The experimental procedure comprised starting with an exemplary engine having a clean combustion chamber, i.e. no deposits on the combustion chamber and no thermal barrier coating. The test condition corresponded to a standard engine operating point of 2000 rpm at a load of 350 kPa NMEP (net mean-effective pressure). An exhaust rebreathing valve strategy was used as an enabler for controlled auto-ignition. The engine was operated with direct in-cylinder gasoline injection at constant air/fuel ratio of 20:1. The intake air and coolant/oil temperatures were fixed at 90 and 95 deg C., respectively. Combustion, emissions, and CCD thickness measurements were made at regular intervals.

Results shown in FIGS. 2, 3, and 4 comprise data-graphs detailing various parameters determined as a function of engine operation over an extended period. FIG. 2 shows a measure of burn duration, measured in degrees of crank angle rotation ('CA'), and location of peak pressure ('LPP') over 2400 minutes (40 hours) of engine operation. FIG. 3 shows the same data as shown in FIG. 2, analyzed in terms of a heat release rate measured in Joules per engine crank angle rotation (Joules/CA) as a function of hours of operation. The zero value ('0') for crank angle shown in FIG. 3 corresponds to a piston top-dead-center point at the transition between the compression and power strokes of the known four-stroke engine operation. Parametric values for each show a substantial change in location and magnitude of heat release rate over time of operation. As shown in FIG. 3, a peak rate of heat release increases with increasing run time. Duration of heat release, or burn duration, decreases. Location of peak pressure ('LPP') advances with increasing run time. Referring now to FIG. 4, there is shown a time-related corresponding reduction (i.e., an improvement) in combustion stability, measured in terms of coefficient of variation of engine-indicated mean-effective pressure ('COV-IMEP'), a degradation in an emission index of engine-out NOx emissions ('EI-NOx'), and a minor improvement in an emission index of engine-out hydrocarbon ('EIHC') emissions. The emissions results are consistent with the observed reduction in burn duration indicated in FIG. 2. The values for COV-IMEP and EIHC appear to be essentially stable after about 1600 minutes of operation.

Figure 5:
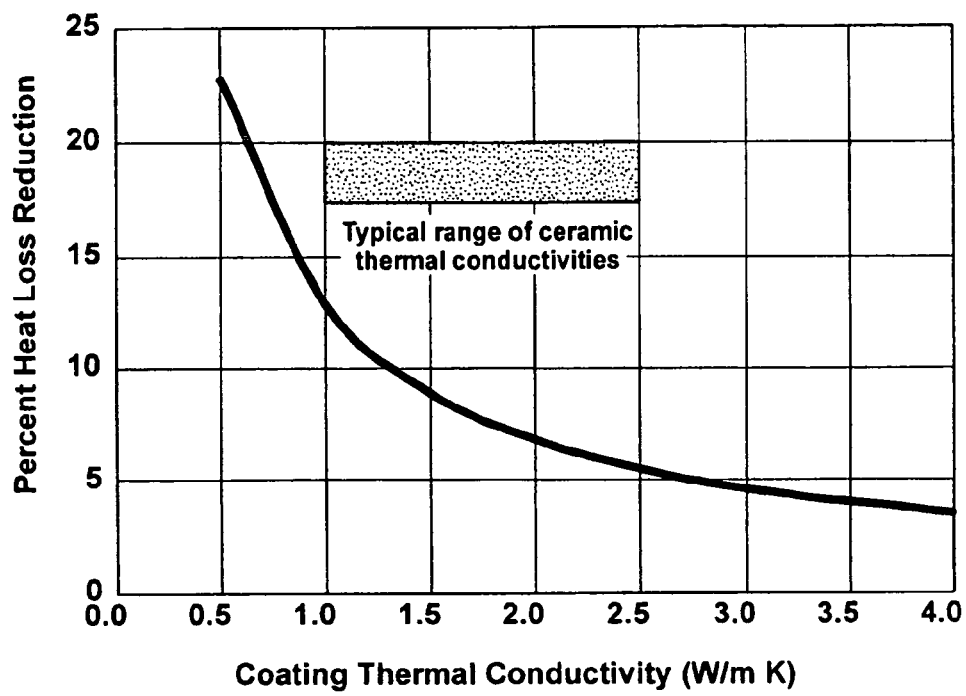
Figure 6:
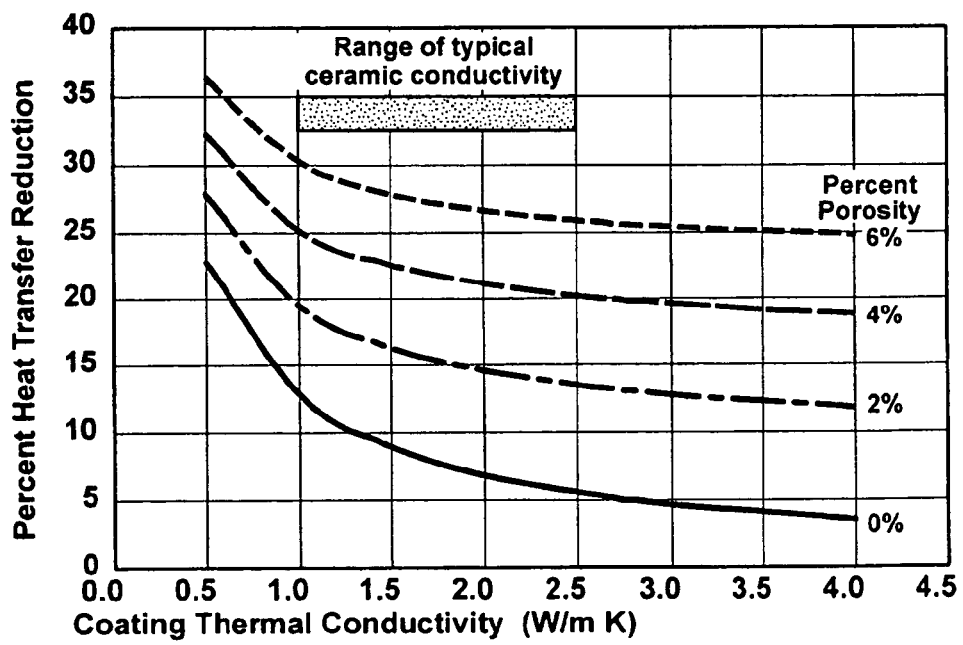
Figure 7:
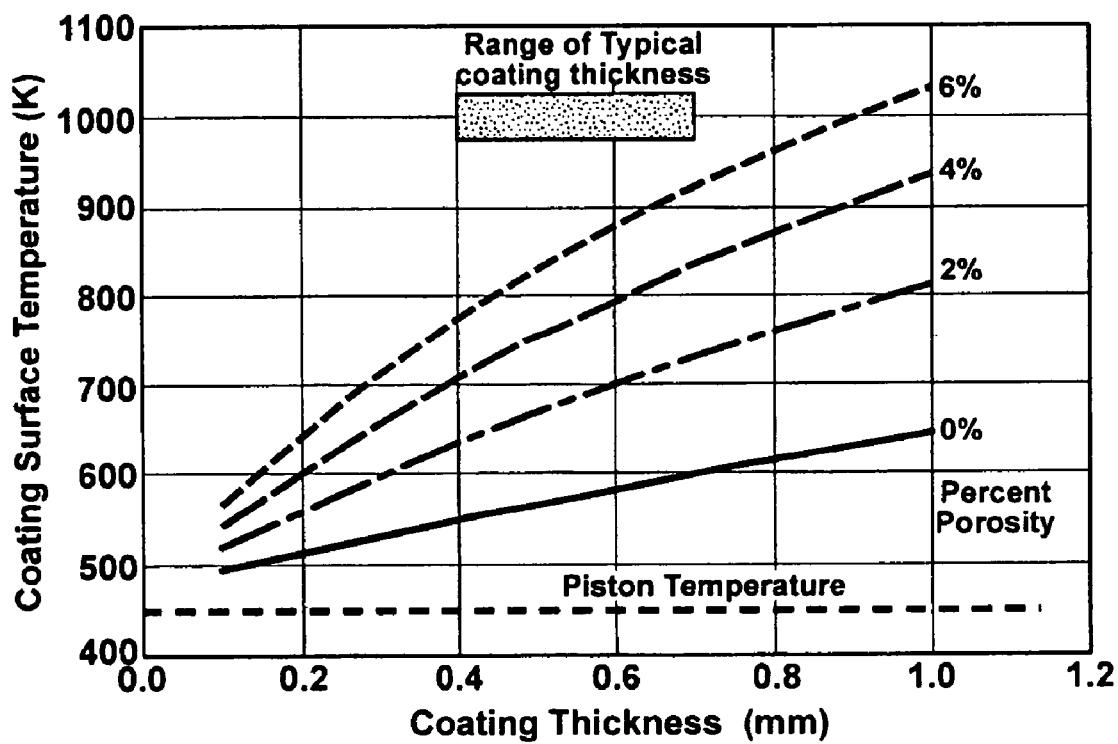

Referring now to FIGS. 5, 6, and 7, the magnitude of the reduction in heat transfer due to application of a thermal barrier coating can be estimated by using some order of magnitude estimates for the conditions within an exemplary HCCI engine cylinder. Total thermal resistance for an exemplary system with an applied thermal barrier coating is represented mathematically as Eq. 1, below:

$$R_{tot} = R_{conv} + R_{conv} + R_{cond,coating} + R_{cond,cylinder} \quad [1]$$

wherein $R_{conv}$ is thermal resistance to convective heat transfer; $R_{cond, coating}$ is thermal resistance to conductive heat transfer of a coating, and $R_{cond,cylinder}$ is thermal resistance to conductive heat transfer of the engine cylinder. The following estimates were used for heat transfer coefficients and material properties: Cylinder wall thickness of 10 mm; cylinder thermal conductivity=160 W/m K (for an aluminum block material); convective heat transfer coefficient=300 W/m² K; and, coating thickness=0.5 mm.

Results shown with reference to FIG. 5 indicate an effect of thermal conductivity of an exemplary thermal barrier coat, shown in percent reduction in heat transfer rate. The percent reduction is relative to a system having no coating. For the range of thermal conductivities currently known thermal barrier coatings applicable for use in engine applications the percent reduction in heat transfer is reduced by 12 to 5%.

Detailed material analysis of exemplary structures of ceramic-based thermal barrier coatings shows that they typically are porous. Porosity of the ceramic is important for two reasons. First, the porosity relieves stress in the thermal barrier coating material as it expands and cools with fluctuating temperatures. This enables the coating material to have good fatigue strength under extreme temperature cycles, as are experienced in combustion environments. The second effect of porosity is to decrease effective thermal conductivity of the coating. Heat transfer through gas contained in the small pores is by conduction. Since gases have very low thermal conductivities relative to metals (roughly 10,000 times smaller) thermal resistance of a porous coating increases substantially. An order of magnitude estimate of the influence of porosity on the heat transfer can be made by treating the coating as adjacent layers of solid ceramic material and a thin layer of gas.

Results shown with reference to FIG. 6 demonstrate percent heat transfer reduction as a function of both thermal conductivity of typical ceramic thermal barrier coating and the level of porosity. The data shows that increasing the porosity is effective to reducing the heat transfer rates. At a ceramic thermal conductivity level of 2 W/m-K, the percent heat transfer reduction is increased by over a factor of 2 with just. 2% porosity. When the porosity is increased to 6% the heat transfer rate, relative to no coating, is increased to over 25%.

Referring now to FIG. 7, results demonstrate an effect of both coating thickness and porosity on surface temperature. In addition to reducing the heat transfer rate from the cylinder the thermal barrier coating material also increases surface temperature, the relevance of which has been discussed hereinabove. Using thermal resistances the temperature can be determined, once the total heat transfer rate is known, using Eq. 1. For these calculations ceramic thermal conductivity was assumed to be 2 W/m K, peak temperature was 1800K, and low temperature (i.e. the piston surface temperature) was 450 K. The cylinder surface temperature without the coating was 475 K. The results indicate that temperature increases more or less linearly with the coating thickness and the level of porosity. Using a typical coating thickness of 0.5 mm (0.020 in) and 5% porosity the peak surface temperature is estimated to be in a range of 700 to 800 K.

Based upon this analysis, the preferred thermal barrier coating 37 comprises a coating having physical and thermal properties analogous to the physical and thermal properties of the combustion chamber deposits, which are consistent with the following range of parametric values, in order to effectively accomplish the task of providing thermal performance equivalent to or substantially equal to that of combustion chamber deposits. The heat capacity is in a range of $0.03 \times 10^6$ J/m³-K to $2.0 \times 10^6$ J/m³-K; thermal conductivity is in a range of 0.25 W/m-K to 2.5 W/m-K; and, thermal diffusivity is in a range of $1 \times 10^{-7}$ m²/s to $8 \times 10^{-6}$ m²/s. The thermal properties for heat capacity, thermal conductivity, and thermal diffusivity were derived from the above analysis and a review of scientific literature that quantified various thermal characteristics of engine combustion chamber deposits, which was experimentally determined using various spark-ignition and compression-ignition engines, and using different fuels and fuel/oil combinations.

Therefore, a thermal barrier coating 37 applied to one or more surfaces of the combustion chamber 36 having thermal characteristics of combustion chamber deposits, as described above, improves combustion stability in the exemplary engine operating in a controlled auto-ignition combustion mode, and mitigates time-varying effects of CCDs on HCCI engine operation. It is readily apparent that reducing combustion variability of the exemplary HCCI engine at low speed/load conditions due to reduced heat loss leads to an ability to extend the speed/load operating region at which the engine is able to operate in the controlled auto-ignition combustion mode.

One material suitable for use as a thermal barrier coating in the exemplary HCCI engine comprises a Yttria-Stabilized Zirconia Oxide (YSZ) ceramic material applied using a thermal spray. An exemplary system constructed of a form of this material has a thermal conductivity of 2 W/m K, a low coefficient of thermal expansion, and high temperature corrosion and oxidation resistance properties.

Exemplary locations for material deposition comprise various components which, in combination, form the combustion chamber 36, as previously described. Locations include the top 48 of each piston including the bowl surface 44 of each piston, the wall surfaces of the cylinder 5, the surfaces of the intake and exhaust valves 28, 30, 32, 34, and the surface portion of the head 14 exposed in the combustion chamber 36. The surface coating materials 37 preferably comprise a variation on an existing surface coating, including the aforementioned Yttria-Stabilized Zirconia Oxide (YSZ) ceramic material applied using a thermal spray, or other metal or ceramic materials formulated and applied at an appropriate thickness and at locations achieve the aforementioned thermal properties for heat capacity, thermal conductivity, and thermal diffusivity.

The surface coating materials 37 may be applied using one of several known application techniques, including, for example, ceramic-coating and plasma-spraying. Such application is driven in part by characteristics related to durability of the coating and on-going performance of the coating, and is not described in detail herein.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method to control timing of combustion in an internal combustion engine operative in a controlled auto-ignition combustion mode, said engine comprising a direct-injection, four-stroke, internal combustion engine including a variable volume combustion chamber defined by a piston reciprocating within a cylinder between top-dead-center and bottom-dead-center points and a cylinder head comprising an intake valve and an exhaust valve; the method comprising:

determining a state of an engine operating parameter corresponding to combustion heat release subsequent to operating the internal combustion engine in the controlled auto-ignition combustion mode for an extended period of time;

determining a preferred heat transfer rate from the combustion chamber corresponding to the state of the engine operating parameter corresponding to the combustion heat release subsequent to operating the internal combustion engine in the controlled auto-ignition combustion mode for an extended period of time; and applying a surface coating to a portion of surfaces of the combustion chamber to effect the preferred heat transfer rate from the combustion chamber.

2. The method of claim 1, comprising applying the surface coating to a bowl surface of the piston.

3. The method of claim 2, comprising applying the surface coating to a crown surface of the piston.

4. The method of claim 3, comprising applying the surface coating to top surfaces of the intake and exhaust valves.

5. The method of claim 4, comprising applying the surface coating to a top surface of the cylinder head exposed to the combustion chamber.

6. The method of claim 1, comprising applying the surface coating to a surface of walls of the cylinder.

7. The method of claim 1, comprising applying the surface coating to a top surface of each piston, a top surface portion of each intake and exhaust valve, a surface portion of the cylinder head exposed to the combustion chamber, and, a wall surface of the cylinder.

8. The method of claim 1, wherein determining a state of an engine operating parameter corresponding to combustion heat release subsequent to operating the internal combustion engine in the controlled auto-ignition combustion mode for an extended period of time comprises determining a state of an engine operating parameter corresponding to a burn duration of a combustion charge in the internal combustion engine operating in the controlled auto-ignition combustion mode.

9. The method of claim 1, wherein determining a state of an engine operating parameter corresponding to combustion heat release subsequent to operating the internal combustion engine in the controlled auto-ignition combustion mode for an extended period of time comprises determining a state of an engine operating parameter corresponding to a location of peak pressure of a combustion charge in the internal combustion engine operating in the controlled auto-ignition combustion mode.

10. The method of claim 1, wherein determining a state of an engine operating parameter corresponding to combustion heat release subsequent to operating the internal combustion engine in the controlled auto-ignition combustion mode for an extended period of time comprises determining a state of an engine operating parameter corresponding to combustion stability in the internal combustion engine operating in the controlled auto-ignition combustion mode.

11. The method of claim 1, wherein applying a surface coating to a portion of surfaces of the combustion chamber to effect the preferred heat transfer rate from the combustion chamber comprises applying a surface coating comprising the following thermal parameters:

a) heat capacity in a range of $0.03 \times 10^6$ J/m3-K to $2.0 \times 10^6$ J/m3-K;

b) thermal conductivity in a range of 0.25 W/m-K to 2.5 W/m-K; and c) thermal diffusivity in a range of $0.1 \times 10^{-7}$ m$^2$/s to $8 \times 10^{-6}$ m$^2$/s.

* * * * *